Sept. 6, 1949.  E. A. MILLER  2,481,325
SELF-LOCKING MOUNTABLE FASTENER MEMBER
Filed Sept. 19, 1944
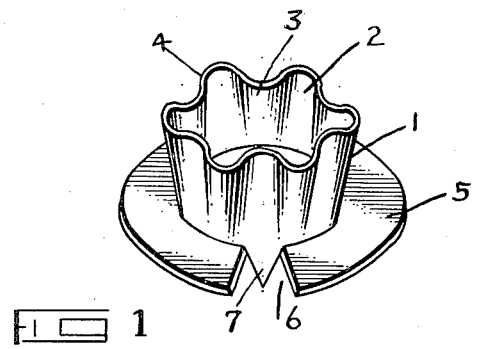
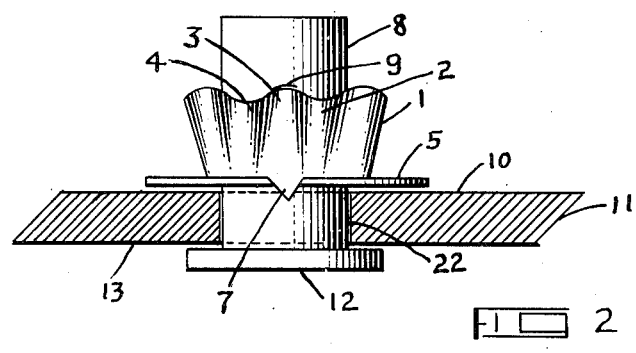
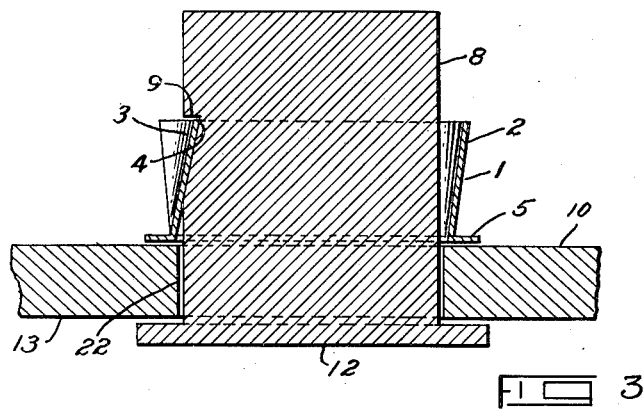
EDWIN AUGUST MILLER INVENTOR.
BY
George Henry Elwell
ATTY Patented Sept. 6, 1949

2,481,325

UNITED STATES PATENT OFFICE 2,481,325

SELF-LOCKING MOUNTABLE FASTENER MEMBER

Edwin August Miller, Fairfield, Conn.

Application September 19, 1944, Serial No. 554,750

3 Claims. (Cl. 85—36)

This invention relates to a self-locking mountable fastener member and more particularly to such a member having surface-waved marginal border formations adapted to resist yieldingly any forced contact with confining surfaces of a member with which it is assembled.

The object of the invention is not only to provide a mountable fastener member that is self-locking but also to provide a fastener member that is adapted to be assembled with another member merely by being pushed into contact therewith.

With reference to the accompanying drawing, Figure 1 is a perspective view of one form of the device; Figure 2 is an upright view of the same form of device but assembled upon the shank of a rivet inserted within work illustrated in cross-section; Figure 3 is an upright view similar to Figure 2 but with parts in cross-section.

With more particular reference to the accompanying drawing, the numeral 1 designates the surface-waved marginal border of the device, said border 1 comprising the alternated convex and concave surface portions 2 and 3, respectively, each of said surface portions having the self-locking curved cut edge 4.

Figure 1 illustrates an annular form of the device having the surface-waved integral portions 2 and 3, each with the curved cut edge 4 and the said device having the annular flange 5 interrupted by the opening 6 the material from which provides the prong 7 extending downwardly in a plane transverse to that of the flange 5. With relation to the shank 8 of the rivet, illustrated by the Figure 2, the inside diameter between oppositely positioned concave portions 3 of the surface-waved border 1 is slightly less than the outside diameter of the shank 8 so that in use, as illustrated by the Figure 2, the device may be pushed down over the shank 8 against the resisting outwardly yielding of the concave portions 3.

Figure 2 illustrates the annular form of the device mounted and self-locked upon the shank 8, the curved edge 4 of the centrally positioned concave portion 3 of the surface-waved border 1 being illustrated as having dug into the shank periphery, as at 9 and better shown by the Figure 3, thereby preventing attempted withdrawal of the device from off the shank 8, the curved cutting edge 4 of all of the other concave portions 3 are adapted to likewise dig into the periphery of the shank 8 to augment the holding propensity of the device. The shank 8 is illustrated projecting from the upper surface 10 of the work-piece 11 which work-piece is illustrated in cross-section. The shank head 12 engages the lower surface 13 while the flange 5 of the device rests upon the upper surface 10. The prong 7 is illustrated as depending in space in the absence in the drawing of that portion of the work-piece 11 illustrated only in cross-section, the prong 7 being adapted to dig into the upper surface 10 to prevent relative rotary movement between the device and the work-piece 11.

It is obvious that, should the curved cutting edges 4 be rounded, the self-locking propensities of the device would not be positive but merely frictional.

I claim:

1. A self-locking fastener comprising a tubular shell of thin metal, the shell at one end having a flange; alternately spaced uniform convex and concave unbroken rim formations provided at the opposite end, the shell wall of said convex formations being inclined outwardly from said flange and the shell wall of said concave formations being inclined inwardly from said flange and converging toward the tubular axis; and cutting edges with which the most far-reaching portions of said concave formations are provided for engagement with a rivet over which the shell is adapted to be placed and behind shoulders cut into the surface of the rivet by the said cutting edges upon an attempted withdrawal of said shell from the rivet.

2. A self-locking fastener comprising a tubular shell of thin metal, the shell at one end having a flange; alternately spaced uniform convex and concave unbroken rim formations provided at the opposite end, the shell wall of said convex formations being inclined outwardly from said flange and the shell wall of said concave formations being inclined inwardly from said flange and converging toward the tubular axis; and cutting edges with which the most far-reaching portions of said formations are provided for engagement with a rivet with which the said shell is adapted to be associated and behind shoulders cut into the surface of the rivet by certain of said cutting edges upon an attempted withdrawal of said shell from the rivet.

3. A push fastener for self-locking engagement upon the surface of a rivet, the fastener comprising a tubular shell of thin metal, the shell having at one end a flange; alternately spaced uniform convex and concave unbroken rim formations provided at the other end, the shell wall of said convex formations being inclined outwardly from said flange and the shell wall of said concave formations being inclined inwardly from said flange and converging toward the tubular axis; a cutting edge with which the crest of each concave formation is provided for locking the fastener against withdrawal, said crest being lodged behind a rearwardly facing shoulder of the rivet cut by said cutting edge; and a downwardly extending prong integral with said shell adjacent said flange and engageable with a work-piece to prevent relative rotation thereof and said shell.

EDWIN AUGUST MILLER.

REFERENCES CITED

The following references are of record in the file of this patent:

UNITED STATES PATENTS

| Number | Name | Date |
|---|---|---|
| 396,900 | Starr | Jan. 29, 1889 |
| 799,924 | Murphy | Sept. 19, 1905 |
| 1,756,256 | Neuberth | Apr. 29, 1930 |
| 1,913,864 | Walper | June 13, 1933 |
| 2,130,597 | Oldham | Sept. 20, 1938 |
| 2,140,441 | Clark | Dec. 13, 1938 |
| 2,159,393 | McCrudden | May 23, 1939 |
| 2,238,238 | Westrope | Apr. 15, 1941 |
| 2,261,650 | Kost | Nov. 4, 1941 |
| 2,296,046 | Miller | Sept. 15, 1942 |